(12) United States Patent
Lin et al.

(10) Patent No.: US 12,242,810 B2
(45) Date of Patent: Mar. 4, 2025

(54) DOMAIN CONTEXT ELLIPSIS RECOVERY FOR CHATBOT

(71) Applicant: Microsoft Technology Licensing, LLC, Redmond, WA (US)

(72) Inventors: Pingping Lin, Redmond, WA (US); Ruihua Song, Beijing (CN); Lei Ding, Beijing (CN); Yue Liu, Redmond, WA (US); Min Zeng, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 204 days.

(21) Appl. No.: 17/631,666

(22) PCT Filed: Jun. 17, 2020

(86) PCT No.: PCT/US2020/038016
§ 371 (c)(1),
(2) Date: Jan. 31, 2022

(87) PCT Pub. No.: WO2021/050133
PCT Pub. Date: Mar. 18, 2021

(65) Prior Publication Data
US 2022/0277145 A1     Sep. 1, 2022

(30) Foreign Application Priority Data
Sep. 12, 2019    (CN) .......................... 201910863956.7

(51) Int. Cl.
*G06F 40/35*     (2020.01)
*G06F 16/332*     (2019.01)
(Continued)

(52) U.S. Cl.
CPC .......... *G06F 40/35* (2020.01); *G06F 16/3329* (2019.01); *G06F 40/253* (2020.01); *H04L 51/02* (2013.01)

(58) Field of Classification Search
CPC .... G06F 40/35; G06F 16/3329; G06F 40/253; H04L 51/02
See application file for complete search history.

(56) References Cited

U.S. PATENT DOCUMENTS 9,589,060 B1 * 3/2017 MacGillivray ... G06F 16/24522
10,418,032 B1 * 9/2019 Mohajer ............. G10L 15/1815
(Continued)

FOREIGN PATENT DOCUMENTS

| CN | 108334487 A | 7/2018 |
|----|-------------|--------|
| CN | 109657238 A | 4/2019 |

OTHER PUBLICATIONS

Tang et al. Distilling Task-Specific Knowledge from BERT into Simple Neural Networks, 2019, arXiv, whole document (Year: 2019).*

(Continued)

*Primary Examiner* — Sonia L Gay
(74) *Attorney, Agent, or Firm* — Schwegman Lundberg & Woessner, P.A.

(57) ABSTRACT

Methods and apparatuses for performing context completion to messages in a session are provided in the present disclosure. A message may be obtained. It may be detected that there exists context ellipsis in the message. It may be determined whether the message is retained in the current domain of the session. In response to determining that the message is retained in the current domain, a complementary text for recovering the context ellipsis may be selected in the current domain. A completed message may be generated based on the message and the complementary text.

15 Claims, 9 Drawing Sheets

(51) Int. Cl.
    *G06F 16/3329*   (2025.01)
    *G06F 40/253*    (2020.01)
    *H04L 51/02*     (2022.01)

(56) References Cited

U.S. PATENT DOCUMENTS

| | | | | |
|---|---|---|---|---|
| 11,200,885 | B1* | 12/2021 | Mandal | G06F 40/279 |
| 2014/0067361 | A1* | 3/2014 | Nikoulina | G06F 40/44 |
| | | | | 704/2 |
| 2014/0257792 | A1 | 9/2014 | Gandrabur et al. | |
| 2017/0060994 | A1* | 3/2017 | Byron | G10L 15/22 |
| 2018/0278561 | A1 | 9/2018 | Carnevale et al. | |
| 2019/0188257 | A1* | 6/2019 | Iida | G06N 3/045 |
| 2019/0311716 | A1* | 10/2019 | Morishita | G10L 15/30 |
| 2022/0075958 | A1* | 3/2022 | Zeng | G06F 16/35 |

OTHER PUBLICATIONS

Oh, Out-of-Domain Detection Method Based on Sentence Distance for Dialogue Systems, 2018, IEEE, whole document (Year: 2018).*
Yang, End-to-End Neural Context Reconstruction in Chinese Dialogue, 2019, Association for Computational Linguistics, whole document (Year: 2019).*
Liu, Exploring the steps of Verb Phrase Ellipsis, 2016, Association for Computational Linguistics, whole documentt (Year: 2016).*
Chen, Junnan, "Deep Context Resolution", A Thesis presented to the University of Waterloo in Fulfillment of the Thesis Requirement for the Degree of Master of Mathematics in Computer Science, May 17, 2018, 58 Pages.
Debnath, et al., "Identifying, Classifying and Resolving Non-Sentential Utterances in Customer Support Systems", Retrieved form: http://semdial.org/anthology/Z18-Debnath_semdial_0006.pdf, Nov. 8, 2018, 9 Pages.
Kumar, et al., "Non-sentential Question Resolution using Sequence to Sequence Learning", In Proceedings of the 26th International Conference on Computational Linguistics: Technical Papers, Dec. 11, 2016, pp. 2022-2031.
Lin, et al., "Ellipsis and Coreference Resolution in a Computerized Virtual Patient Dialogue System", In Journal of Medical Systems, vol. 40, Issue 9, Aug. 12, 2016, 15 Pages.
Lin, et al., "Using BERT to Process Chinese Ellipsis and Coreference in Clinic Dialogues", In Proceedings of the IEEE 20th International Conference on Information Reuse and Integration for Data Science, Jul. 30, 2019, pp. 414-418.
"International Search Report and Written Opinion Issued in PCT Application No. PCT/US20/038016", Mailed Date: Sep. 28, 2020, 14 Pages.
Office Action Received for Chinese Application No. 201910863956.7, mailed on Feb. 23, 2024, 9 pages (English Translation Provided).
Office Action Received for Chinese Application No. 201910863956.7, mailed on Sep. 30, 2024, 6 pages. (English Translation Provided).

* cited by examiner

DOMAIN CONTEXT ELLIPSIS RECOVERY FOR CHATBOT

CROSS-REFERENCE TO RELATED APPLICATIONS

This application is a U.S. National Stage Filing under 35 U.S.C. 371 of International Patent Application Serial No. PCT/US2020/038016, filed Jun. 17, 2020, and published as WO/2021/050133 A1 on Mar. 18, 2021, which claims priority to Chinese Patent Application Serial No. 201910863956.7, filed Sep. 12, 2019, which application and publication are incorporated herein by reference in their entirety.

BACKGROUND

Artificial intelligence (AI) chatbots are becoming more and more popular and are being used in more and more scenarios. Chatbots are designed to simulate human utterances and may chat with users through text, voice, images, etc. In general, a chatbot may identify the language content within a message input by a user or apply natural language processing to the message, and then provide the user with a response to the message.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Methods and apparatuses for performing context completion to messages in a session are proposed in embodiments of the present disclosure. A message may be obtained. It may be detected that there exists context ellipsis in the message. It may be determined whether the message is retained in the current domain of the session. In response to determining that the message is retained in the current domain, a complementary text for recovering the context ellipsis may be selected in the current domain. A completed message may be generated based on the message and the complementary text.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

Figure 1:
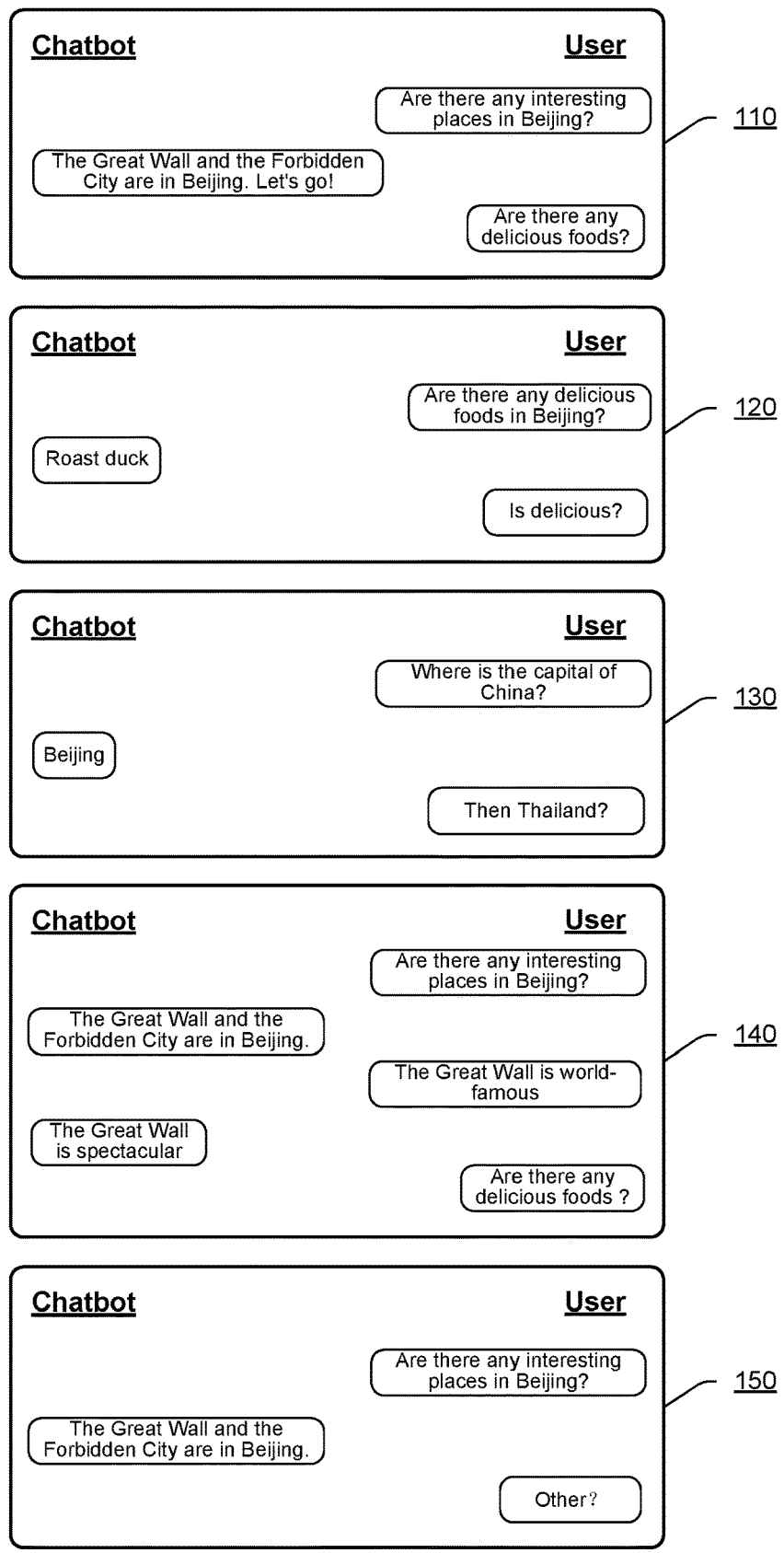
FIG. 1 illustrates exemplary sessions in which there exists context ellipsis.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Usually, a chatbot may chat automatically in a session with a user. Herein, "session" may refer to a time continuous dialog between two chat participants, and may comprise messages and responses in the dialog. "Message" may refer to any information input by a user, e.g., a query from a user, an answer of a user to a chatbot's question, an opinion of a user, etc. The term "message" and the term "query" may also be used interchangeably. "Response" may refer to any information provided by a chatbot, e.g., an answer of a chatbot to a user's question, a comment by a chatbot, etc.

In a session between a user and a chatbot, the user may often input messages with incomplete semantics, e.g., messages in which there exists context ellipsis. Such messages may omit a part of context content that has been involved in the previous chat. For example, if the user previously discussed with the chatbot about travel arrangements to Beijing, the user may then input a message "Are there any interesting places?". This message omits the previously discussed context "Beijing", which actually means "Are there any interesting places in Beijing?". When a message in which there exists context ellipsis is obtained, the chatbot needs to identify what context content is omitted and perform context completion to the message accordingly, so that it may provide a response to the message for which the omitted context content is completed.

At present, some techniques specifically for performing context completion to sentences in which there exits context ellipsis have been proposed. These techniques aim to select complementary text from a predetermined set of candidate texts, so as to convert sentences that are known as having context ellipsis into completed sentences that have been performed context completion. The set of candidate texts are predetermined and fixed, and these existing techniques do not provide a mechanism that may update the set of candidate texts with specific application scenarios. Moreover, usually, these existing techniques can only be applied in an open domain or a specific domain, but cannot be efficiently and quickly transferred among different domains. For example, models or network architectures on which these existing techniques are based require to use labeled training data obtained from corpus of an open domain or a specific domain. Therefore, when applying to a new domain, it is needed to further use new labeled training data obtained from a corpus of the new domain to reconstruct or train these models or network architectures. The acquisition process of the new labeled training data and the reconstructing or training process are all time-consuming and high costly.

Embodiments of the present disclosure propose an end-to-end architecture for performing context completion to messages in a session. This session may occur, e.g., in an automatic chat between a user and a chatbot. In this end-to-end architecture, a series of processing for context completion of messages may be automatically performed as the session proceeds. For example, the processing may comprise, but not limited to, at least one of: determining whether there exists context ellipsis in the current message; determining whether the current message is retained in the current domain; continuously updating candidate texts that are to be selected for recovering the context ellipsis; selecting a complementary text for performing context completion to the current message from the candidate texts; generating a completed message; and so on. Moreover, in the case that the current message is not retained in the current domain, a domain corresponding to the current message may also be determined, and context completion to the current message may be performed in the corresponding domain. The embodiments of the present disclosure may provide simple, efficient, and high-accuracy context completion for messages in which there exists context ellipsis, in an automatic chat scenario where session content continuously evolves.

Herein, context ellipsis may comprise topic ellipsis and/or predicate ellipsis. A topic may refer to an entity or a subject involved in a session, which may comprise one or more nouns or noun phrases. A predicate may refer to an expression taking verbs as a main part in a session or an expression about an entity's attributes in a session, which may comprise one or more verbs or verb phrases, or other phrases used for describing attributes. Taking "Are there any interesting places in Beijing?" as an example, the topic may be "Beijing", and the predicate may be "Are there any interesting places". Taking "Where is the capital of China?" as an example, the topic may be "China", and the predicate may be "Where is the capital".

In one aspect, the embodiments of the present disclosure may maintain domain-specific information flows during a session, e.g., a domain topic flow and a domain predicate flow. For different domains, different information flows corresponding to the different domains may be maintained respectively. Therefore, when requiring to perform context completion to a message in a certain domain, a complementary text may be selected from candidate texts in information flows maintained for the domain to perform context completion to the message. Moreover, through maintaining information flows, chat context from a multiple-round session may be recorded, so that context completion to messages in the multiple-round session may be implemented effectively.

In one aspect, the embodiments of the present disclosure may apply the same model or network architecture, that is used for ranking candidate texts, to different domains. Basically, the ranking model does not require labeled data from domains, and thus the ranking model may be easily transferred among different domains. The ranking of candidate texts utilizes features with higher accuracy and lighter weight, e.g., pointwise mutual information (PMI), etc. Compared with the labeled training data adopted in the existing techniques, a large amount of PMI data in different domains may be obtained more easily. When implementing or applying the ranking model, ranking may be performed in different domains by directly using PMI data in different domains.

In one aspect, the context completion to messages performed by the embodiments of the present disclosure is explicit context completion. For example, informative words or expressions in a session are explicitly maintained in information flows, and completed messages generated according to complementary texts selected from the information flows are also readable. Existing response retrieval or generation techniques may be directly adopted for providing responses to the completed messages without the need of changing existing response retrieval or generation strategy.

FIG. 1 illustrates exemplary sessions in which there exists context ellipsis.

Topic ellipsis directed against the last message is shown in the session 110. The user first inputs a message "Are there any interesting places in Beijing?". The chatbot provides a response "The Great Wall and the Forbidden City are in Beijing. Let's go!". Then, the user inputs a message "Are there any delicious foods?", wherein there exists topic ellipsis in this message, e.g., omitting the topic "Beijing" in the last message "Are there any interesting places in Beijing?". Therefore, the message "Are there any delicious foods?" is intended in fact to express "Are there any delicious foods in Beijing?".

Topic ellipsis directed against the last response is shown in the session 120. The user first inputs a message "Are there any delicious foods in Beijing?". The chatbot provides a response "Roast duck". Then, the user inputs a message "Is delicious?", wherein there exists topic ellipsis in this message, e.g., omitting the topic "roast duck" in the last response "Roast duck". Therefore, the message "Is delicious?" is intended in fact to express "Is roast duck delicious?".

Predicate ellipsis directed against the last message is shown in the session 130. The user first inputs a message "Where is the capital of China?". The chatbot may provide a response "Beijing". Then, the user inputs a message "Then Thailand?", wherein there exists predicate ellipsis in this message, e.g., omitting the predicate "Where is the capital" in the last message "Where is the capital of China". Therefore, the message "Then Thailand?" is intended in fact to express "Then where is the capital of Thailand?".

Topic ellipsis directed against a multiple-round session is shown in the session 140. In the first round of session, the user inputs a message "Are there any interesting places in Beijing?", and the chatbot provides a response "The Great Wall and the Forbidden City are in Beijing". In the second round of session, the user inputs a message "The Great Wall is world-famous", and the chatbot provides a response "The Great Wall is spectacular". In the third round of session, the user inputs a message "Are there any delicious foods?", wherein there is topic ellipsis in this message, e.g., omitting the topic "Beijing" in the first round of session "Are there any interesting places in Beijing?". Therefore, the message "Are there any delicious foods?" is intended in fact to express "Are there any delicious foods in Beijing?".

Both of topic ellipsis and predicate ellipsis directed against the last message are shown in the session 150. The user first inputs a message "Are there any interesting places in Beijing?". The chatbot provides a response "The Great Wall and the Forbidden City are in Beijing". Then, the user inputs a message "Other?", wherein there exists topic ellipsis and predicate ellipsis in this message, e.g., omitting the topic "Beijing" and the predicate "Are there any interesting places" in the last message "Are there any interesting places in Beijing?". Therefore, the message "Other?" is intended in fact to express "Are there any other interesting places in Beijing?".

It should be appreciated that FIG. 1 only shows some session examples in which there exists context ellipsis. In actual application scenarios, there may be various other situations of context ellipsis. The embodiments of the present disclosure may be implemented in various situations of context ellipsis.

Figure 2:
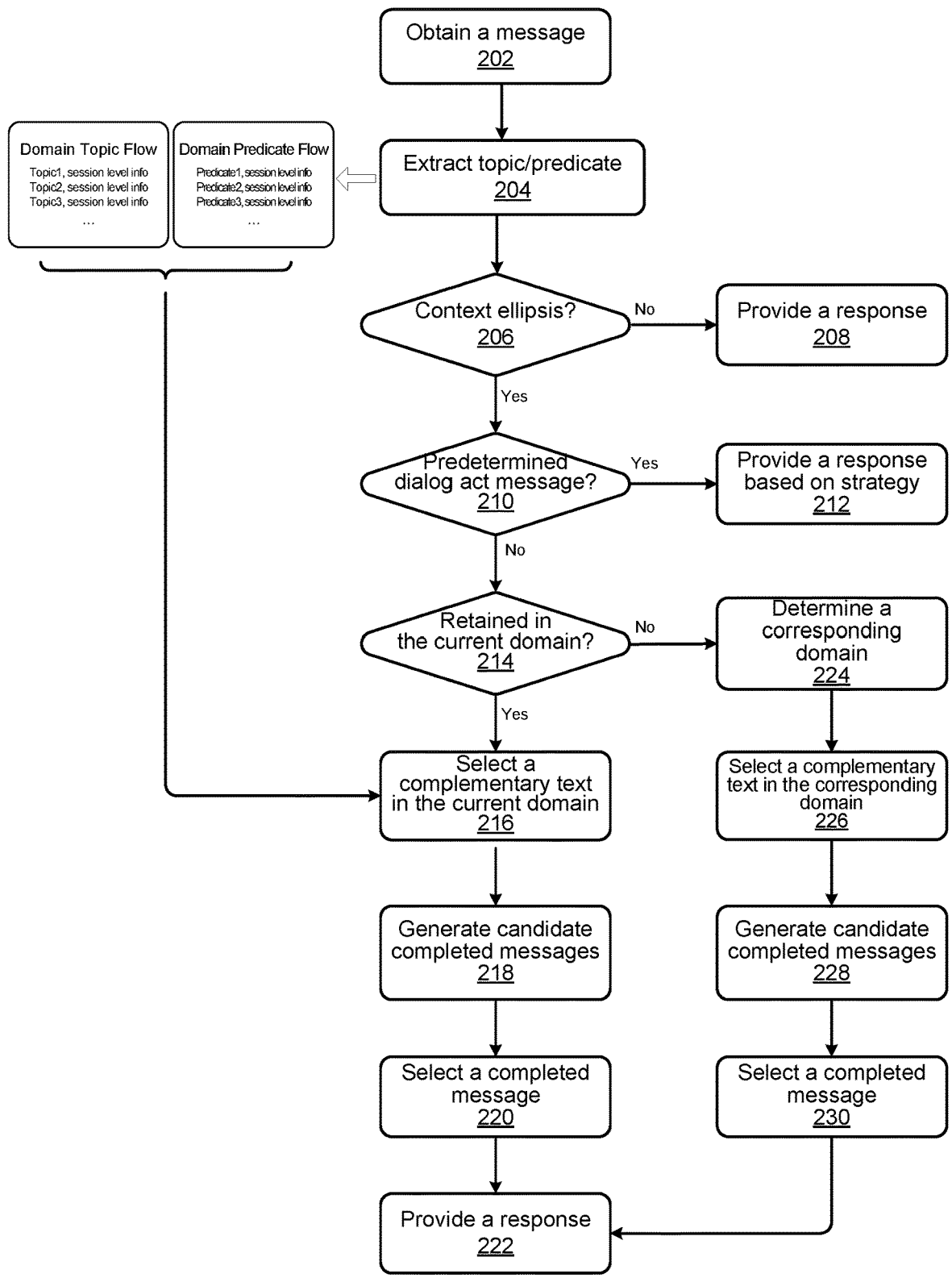
FIG. 2 illustrates an exemplary process for providing responses through performing context completion to messages in a session according to an embodiment.

FIG. 2 illustrates an exemplary process 200 for providing responses through performing context completion to messages in a session according to an embodiment.

At 202, a message from a user may be obtained in a session between the user and a chatbot. For example, the message may be input by the user in a chat session with the chatbot.

According to the embodiments of the present invention, content in the message may be saved to information flows maintained in real time, e.g., a domain topic flow and a domain predicate flow, so as to record context information in the session.

In an implementation, at 204, topic and/or predicate may be extracted from the obtained message. In the case that there exists context ellipsis in the message, the message obtained at 202 may comprise only topic but not predicate, or comprise only predicate but not topic, or comprise neither topic nor predicate. Accordingly, at 204, it is possible to extract, from the message, only a topic, only a predicate, or none of topic and predicate. In the case that there exists no context ellipsis in the message, both topic and predicate may be extracted from the message at 204.

In an implementation, a pre-established knowledge graph may be used for extracting the topic and/or the predicate from the message. The knowledge graph may be domain-specific, e.g., different knowledge graphs are established for different domains. A knowledge graph in a certain domain may comprise topics and predicates previously mined from a large amount of network data in the domain. For example, a knowledge graph in the tourism domain may comprise topics "Beijing", "Great Wall", "Forbidden City in Beijing", "plane ticket", "hotel", etc., and may comprise predicates "food", "interesting place", "capital", "How to go", "What is the climate like", etc. By comparing the content in the message with the knowledge graph, the topic and/or the predicate that have been recorded in the knowledge graph may be identified from the message.

If the topic is extracted from the message at 204, the extracted topic may be stored in a domain topic flow of the current domain. The domain topic flow may comprise a list of topics extracted from messages and responses in the session, e.g., Topic 1, Topic 2, Topic 3, etc. Moreover, optionally, the process 200 may also comprise determining session level information associated with the topic extracted at 204. Accordingly, the domain topic flow may also comprise session level information determined for each topic. Session level information of a topic may comprise statistical information in the session determined for the topic, e.g., a frequency or number of times that the topic has occurred in the session, whether the topic occurred in the last message, whether the topic occurred in the last response, the number of turns having passed since the topic occurred last time, whether the topic came from a message, whether the topic came from a response, etc. The topics and session level information comprised in the domain topic flow may be continuously updated as the session proceeds.

If the predicate is extracted from the message at 204, the extracted predicate may be stored in a domain predicate flow of the current domain. The domain predicate flow may comprise a list of predicates extracted from the messages and responses in the session, e.g., Predicate 1, Predicate 2, Predicate 3, etc. Moreover, optionally, the process 200 may also comprise determining session level information associated with the predicate extracted at 204. Accordingly, the domain predicate flow may also comprise session level information determined for each predicate. Session level information of a predicate may comprise statistical information in the session determined for the predicate, e.g., a frequency or number of times that the predicate has occurred in the session, whether the predicate occurred in the last message, whether the predicate occurred in the last response, the number of turns having passed since the predicate occurred last time, whether the predicate came from a message, whether the predicate came from a response, etc. The predicates and session level information comprised in the domain predicate flow may be continuously updated as the session proceeds.

It should be appreciated that although the process 200 only shows updating the domain topic flow and the domain predicate flow with topics and/or predicates extracted from messages as well as session level information, the embodiments of the present disclosure may also update the domain topic flow and the domain predicate flow in real time with topics and/or predicates extracted from responses provided by a chatbot as well as session level information.

At 206, it may be determined whether there exists context ellipsis in the obtained message. In an implementation, it may be determined whether there exists context ellipsis in the message based on the result of the extracting at 204. For example, if both topic and predicate are extracted from the message, it may be determined that there exists no context ellipsis in the message. If no topic is extracted from the message, it may be determined that there exists topic ellipsis in the message. If no predicate is extracted from the message, it may be determined that there exists predicate ellipsis in the message. If neither topic nor predicate is extracted from the message, it may be determined that there exist both topic ellipsis and predicate ellipsis in the message.

If it is determined at 206 that there exists no context ellipsis in the message, a response may be provided based on existing response retrieval or generation techniques at 208. For example, in the scenario of automatic chat, various response providing techniques that are based on retrieval approach or generation approach have been proposed in order to respond to messages from users.

If it is determined at 206 that there exists context ellipsis in the message, the process 200 proceeds to 210. At 210, it may be further determined whether the message is a message with a predetermined dialog act. A dialog act may refer to a label added to a dialogue sentence according to a category or intention of the meaning of the dialogue sentence. Here, the predetermined dialog act may comprise some previously designated dialog acts, which may correspond to, e.g., brief language expressions that do not comprise explicit topics and predicates. For example, a message with a predetermined dialog act may be a message in which there exits topic ellipsis and predicate ellipsis. An example of a previously designated dialog act may be enquiring details of the last response. For example, for the last response of the chatbot "Beijing is worth traveling", the user may input a message "Why?", which is intended to enquire the specific reason for "Beijing is worth traveling." Another example of a previously designated dialog act may be repeating the last message. For example, the user first inputs a first message "Are there any interesting places in Beijing?", after the chatbot responds by "The Great Wall and the Forbidden City", the user may continue to input a second message "Other?" which is actually intended to repeat the question in the first message in order to obtain further answers. Still another example of a previously designated dialog act may be an intention to end the dialog. For example, if the user inputs a message "I know", the message may indicate that the user does not want to continue the dialog or has a lower willingness to have a dialog. The foregoing only schematically shows examples of types of previously designated dialog acts, and depending on specific application requirements, it may also be determined whether the message has any other type of dialog act at 210.

In an implementation, the determination at 210 may employ a predetermined dialog act classifier, e.g., a classifier which is based on K-means or similar techniques. The predetermined dialog act classifier may be trained for determining whether a message has any predetermined dialog act. For example, training data including dialog sentences with predetermined dialog act labels may be prepared in advance, and such training data may be used for training the predetermined dialog act classifier. When a message is provided to the trained predetermined dialog act classifier, it may determine whether the message has any predetermined dialog act and output the predetermined dialog act that the message has.

If it is determined at 210 that the message has a predetermined dialog act, a response may be provided for the message based on a corresponding strategy at 212. Different response strategies may be designated in advance for different predetermined dialog acts. For example, if the dialog act of the message is determined as enquiring details of the last response, a response including detailed description of the last response may be retrieved or generated. For example, if the dialog act of the message is determined as repeating the last message, a response may be retrieved or generated based on the last message again. If the dialog act of the message is determined as an intention to end the dialog, the dialog may be suspended or a response intended to shift to another topic may be given.

If it is determined at 210 that the message is not a message with a predetermined dialog act, the process 200 proceeds to 214.

At 214, it may be determined whether the message is retained in the current domain of the session. The current domain may refer to the domain in which the round of session immediately before this message locates.

In the case that there exists predicate ellipsis in the message and a topic may be detected, it may be determined, based on the topic included in the message, whether the message is retained in the current domain. In an implementation, if the topic included in the message locates in the domain topic flow of the current domain or locates in the knowledge graph of the current domain, it may be determined that this message is retained in the current domain. If the topic included in the message neither locates in the domain topic flow of the current domain nor locates in the knowledge graph of the current domain, it may be determined that this message is not retained in the current domain.

In the case that there exists topic ellipsis in the message and a predicate may be detected, it may be determined whether the message is retained in the current domain through a domain retaining classifier. In an implementation, the domain retaining classifier may be based on a recurrent neural network (RNN) model. Optionally, a classifier which is based on a bidirectional encoder representations from transformers (BERT) model may be first established for determining whether a sentence is retained in a specific domain, and then a domain retaining classifier which is based on a RNN model may be obtained through knowledge distillation. The operating process and acquisition process of the domain retaining classifier will be discussed in detail later in connection with FIG. 3 and FIG. 4.

If it is determined at 214 that the message is retained in the current domain, the process 200 proceeds to 216. At 216, a complementary text for recovering topic ellipsis or predicate ellipsis may be selected in the current domain. Herein, a complementary text may refer to a text corresponding to context content omitted in a message, e.g., topic or predicate. Accordingly, the complementary text may be used for combining with the message to form a completed message with complete semantics. In the case that the message is retained in the current domain, the complementary text may come from topics in the domain topic flow or predicates in the domain predicate flow in the current domain. For example, if there exists topic ellipsis in the message, the complementary text may be selected from the domain topic flow. If there exists predicate ellipsis in the message, the complementary text may be selected from the domain predicate flow. The topics in the domain topic flow and the predicates in the domain predicate flow may be regarded as candidate texts, and the complementary text may be selected from these candidate texts.

In an implementation, the complementary text may be selected from a plurality of candidate texts in the domain topic flow and/or the domain predicate flow through convolutional neural network (CNN)-based ranking. The CNN-based ranking may rank the plurality of candidate texts so that the top-ranked candidate text is selected as the complementary text. The CNN-based ranking may adopt features such as PMI between a candidate text and the message, text similarity, etc.

In an implementation, the complementary text may be selected from a plurality of candidate texts in the domain topic flow and/or the domain predicate flow through regression-based ranking. The regression-based ranking may rank the plurality of candidate texts so that the top-ranked candidate text is selected as the complementary text. Features adopted by the regression-based ranking may at least comprise, e.g., at least one item of session level information in the domain topic flow and the domain predicate flow.

In an implementation, the complementary text may be selected from a plurality of candidate texts in the domain topic flow and/or the domain predicate flow through both the CNN-based ranking and the regression-based ranking. In this case, the ranking results by the two rankings may be weighted and combined to determine the top-ranked candidate text and use it as the complementary text.

The CNN-based ranking and the regression-based ranking will be discussed in detail later in connection with FIG. 5 and FIG. 6.

After the complementary text is determined, the embodiments of the present disclosure may further generate a completed message based on the message and the complementary text. Herein, a completed message may refer to a message with complete semantics which is formed after performing context completion to a message in which there exists context ellipsis. The completed message may be a readable text.

In an implementation, at 218, at least one candidate completed message may be generated by placing the complementary text at different positions of the message. For example, the complementary text may be placed before the message, after the message, or within the message. Taking a message "Is delicious?" and a complementary text "Roast Duck" as an example, the complementary text may be placed before the message to generate a candidate completed message "Roast duck is delicious?", and the complementary text may be placed after the message to generate a candidate completed message "Is delicious? Roast duck". Taking a message "Let's visit there" and a complementary text "the Forbidden City" as an example, the complementary text may be placed within the message for anaphora resolution, to generate a candidate completed message "Let's visit the Forbidden City". Then, at 220, a completed message may be selected from the at least one candidate completed message through, e.g., a language model. The language model may be used for measuring probability that a text is a natural language sentence, which may be based on a neural network or based on statistics. For example, "Roast duck is delicious?" is closer to natural language than "Is delicious? Roast duck", thus, the language model may give the former a higher score and the latter a lower score. The final completed message may be selected from the at least one candidate completed message according to scores from the language model.

After the completed message is determined, a response to the completed message may be provided at 222. For example, the response to the completed message may be provided based on existing response retrieval or generation techniques.

If it is determined at 214 that the message is not retained in the current domain, e.g., the message is transferred from the current domain to another domain, then the process 200 proceeds to 224. At 224, a domain corresponding to the message may be determined. In an implementation, the domain corresponding to the message may be determined by comparing the message with topics or predicates in knowledge graphs of different domains.

As described above, the embodiments of the present disclosure may maintain different information flows for different domains involved in a session. Therefore, after the domain corresponding to the message is determined, a complementary text may be selected in the corresponding domain at 226. For example, the complementary text may be selected from candidate texts in a domain topic flow or domain predicate flow of the corresponding domain.

At 228, at least one candidate completed message may be generated in a similar approach with the processing at 218. Then, at 230, a completed message may be selected from the at least one candidate completed message in a similar approach with the processing at 220. After the completed message is determined, a response to the completed message may be provided at 222. At this time, the corresponding domain becomes the current domain in which the process 200 will be performed on subsequent messages.

It should be appreciated that all the steps and their execution order in the process 200 discussed above are exemplary, and depending on specific application scenarios and design requirements, the process 200 may be changed in any approaches.

In an implementation, the processing of determining whether the message is retained in the current domain at 214 may be replaced by determining a domain corresponding to the message, which is similar with the processing at 224. After the corresponding domain is determined, the completed message may be further generated through processing similar with those at 226, 228, 230, etc.

In an implementation, if it is determined at 214 that the message is not retained in the current domain, the topic and/or predicate and the session level information extracted at 204 may be transferred from the domain topic flow and/or domain predicate flow of the current domain to a domain topic flow and/or domain predicate flow of the domain corresponding to this message.

In an implementation, when the topic and/or predicate and the session level information are extracted from the message at 204, the extracted content may not be added immediately to the domain topic flow and/or domain predicate flow of the current domain, instead, the content extracted at 204 may be added to the domain topic flow and/or domain predicate flow of the current domain after it is determined at 214 that the message is retained in the current domain.

In an implementation, the order of the processing of determining whether the message is a predetermined dialog act message at 210 in the process 200 may be adjusted. For example, the processing at 210 may be performed before 206, etc.

In an implementation, instead of performing the processing of determining whether the message is a predetermined dialog act message at 210, it may be determined at 210 whether there exist both topic ellipsis and predicate ellipsis in the message. If yes, a response to the message is provided according to a predetermined response rule. The response rule defined for messages with both topic ellipsis and predicate ellipsis may be predetermined empirically.

In an implementation, instead of generating a readable completed message through the processing at 218 and 220, the message and the complementary text may not be semantically combined, but may be directly provided to a response retrieval or generation strategy as a two-tuple.

In an implementation, instead of the process of generating at least one candidate completed message at 218 and then selecting the completed message at 220, the completed message may be generated directly based on a language model after the complementary text is selected at 216. For example, the language model may be trained for generating a completed message in a natural language style based on a message and a complementary text.

In an implementation, the process 200 may be executed recurrently as the session proceeds. For example, each message input by the user may trigger the execution of the process 200. Moreover, a domain topic flow and a domain predicate flow of each domain are also updated in real time. For example, whenever a message or response is detected, a topic and/or predicate and session level information extracted from the message or response may be used for updating a domain topic flow and a domain predicate flow of a corresponding domain.

Figure 3:
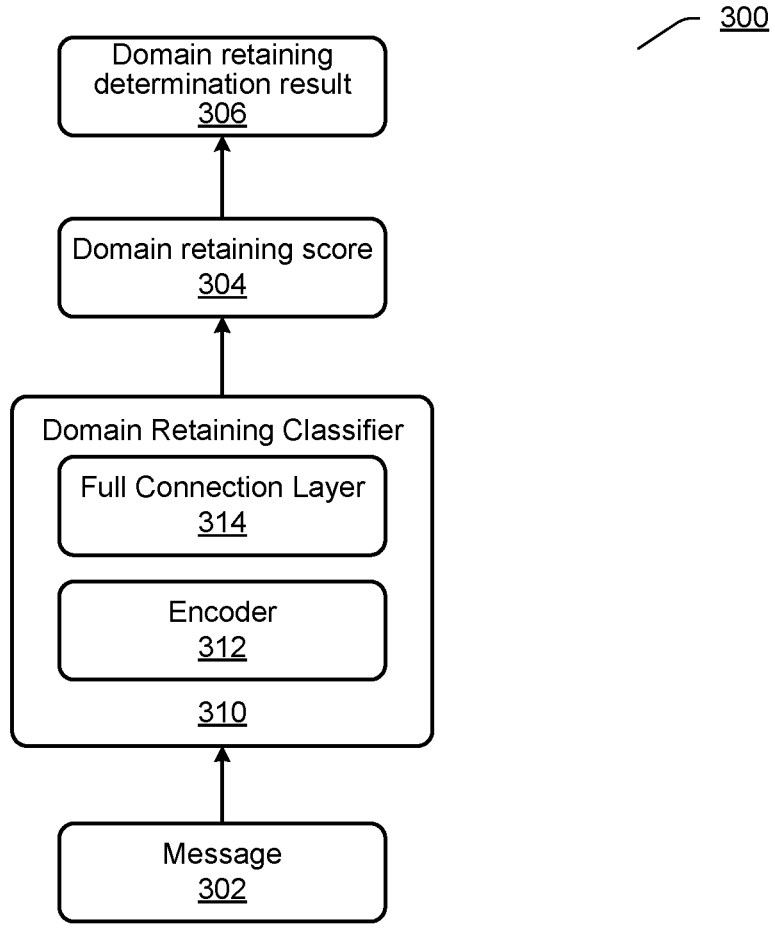
FIG. 3 illustrates an exemplary process for performing domain retaining determination according to an embodiment.

FIG. 3 illustrates an exemplary process 300 for performing domain retaining determination according to an embodiment. The process 300 may be performed for, e.g., determining whether the message is retained in the current domain of the session at 214 in FIG. 2.

In the process 300, a domain retaining classifier 310 is adopted for performing the domain retaining determination. The domain retaining classifier 310 may be trained for a specific domain. The domain retaining classifier may comprise an encoder 312 and a full connection layer 314. The encoder 312 may convert a text into a vector representation in a dense vector space. The full connection layer 314 may convert the vector representation of the text into a domain retaining score for indicating a relevance level between the text and a domain to which the domain retaining classifier 310 belongs.

According to the process 300, a message 302 may be provided to the domain retaining classifier 310. After the processing by the encoder 312 and the full connection layer 314, the domain retaining classifier 310 will output a domain retaining score 304 of the message 302. A domain retaining determination result 306 may be finally obtained based on the domain retaining score 304. For example, a score threshold may be predetermined, and if the domain retaining score 304 exceeds the threshold, the domain retaining determination result 306 may indicate that the message 302 is retained in the domain to which the domain retaining classifier 310 belongs. Otherwise, if the domain retaining score 304 does not exceed the threshold, the domain retaining determination result 306 may indicate that the message 302 is not retained in the domain to which the domain retaining classifier 310 belongs.

Figure 4:
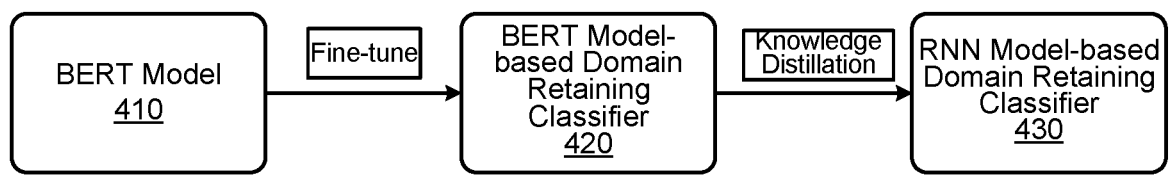
FIG. 4 illustrates an exemplary process for obtaining a domain retaining classifier according to an embodiment.

FIG. 4 illustrates an exemplary process 400 for obtaining a domain retaining classifier according to an embodiment. It should be appreciated that the present disclosure is not limited to obtain a domain retaining classifier through the process 400, but may obtain a domain retaining classifier through any other approaches.

According to the process 400, a BERT model 410 may be pre-trained or obtained first. The BERT model 410 is a general model for generating a vector representation of a text in an open domain. When the BERT model 410 receives a text input, e.g., a message, it may output a vector representation corresponding to the text.

The BERT model 410 may be fine-tuned to obtain a BERT model-based domain retaining classifier 420, wherein the BERT model 410 acts as an encoder of the domain retaining classifier 420. The fine-tuning may adjust parameters or weights in the BERT model with training data for the domain retaining determination, so as to be applicable for performing a task of domain retaining determination. Positive samples in the training data may comprise sentences from a specific domain, and domain keywords are removed from these sentences, e.g., topics belonging to the domain, etc. For example, in order to obtain a domain retaining classifier for the tourism domain, original sentences may be scrawled from tourism-related social network data, website data, chat logs, etc., and positive samples may be obtained through removing domain keywords. Negative samples in the training data may come from sentences in any other domains, and words may be randomly removed or not removed from these sentences. A sentence in the negative samples may be selected as a session sentence having a similar length with a sentence in the positive samples.

The BERT model-based domain retaining classifier 420 may be used for determining whether a message is retained in the current domain. However, considering the complexity and high computation cost of the BERT model itself, in order to facilitate practical deployment, the embodiments of the present disclosure may also obtain a faster and lightweight domain retaining classifier 430 from the BERT model-based domain retaining classifier 420 through knowledge distillation. The lightweight domain retaining classifier 430 may adopt a RNN model as an encoder to replace the BERT model. The RNN model may comprise, e.g., a 3-layer RNN. Knowledge distillation is a general technique that can convert a complex model into a simple model. By performing knowledge distillation on the BERT model-based domain retaining classifier 420, the smaller and faster RNN model-based domain retaining classifier 430 may be obtained. The performance of the RNN model-based domain retaining classifier 430 may approximate the performance of the BERT model-based domain retaining classifier 420. When performing the knowledge distillation, the RNN model-based domain retaining classifier 430 may be trained with text inputs received by as well as vector representations and domain retaining scores produced by the BERT model-based domain retaining classifier 420.

Figure 5:
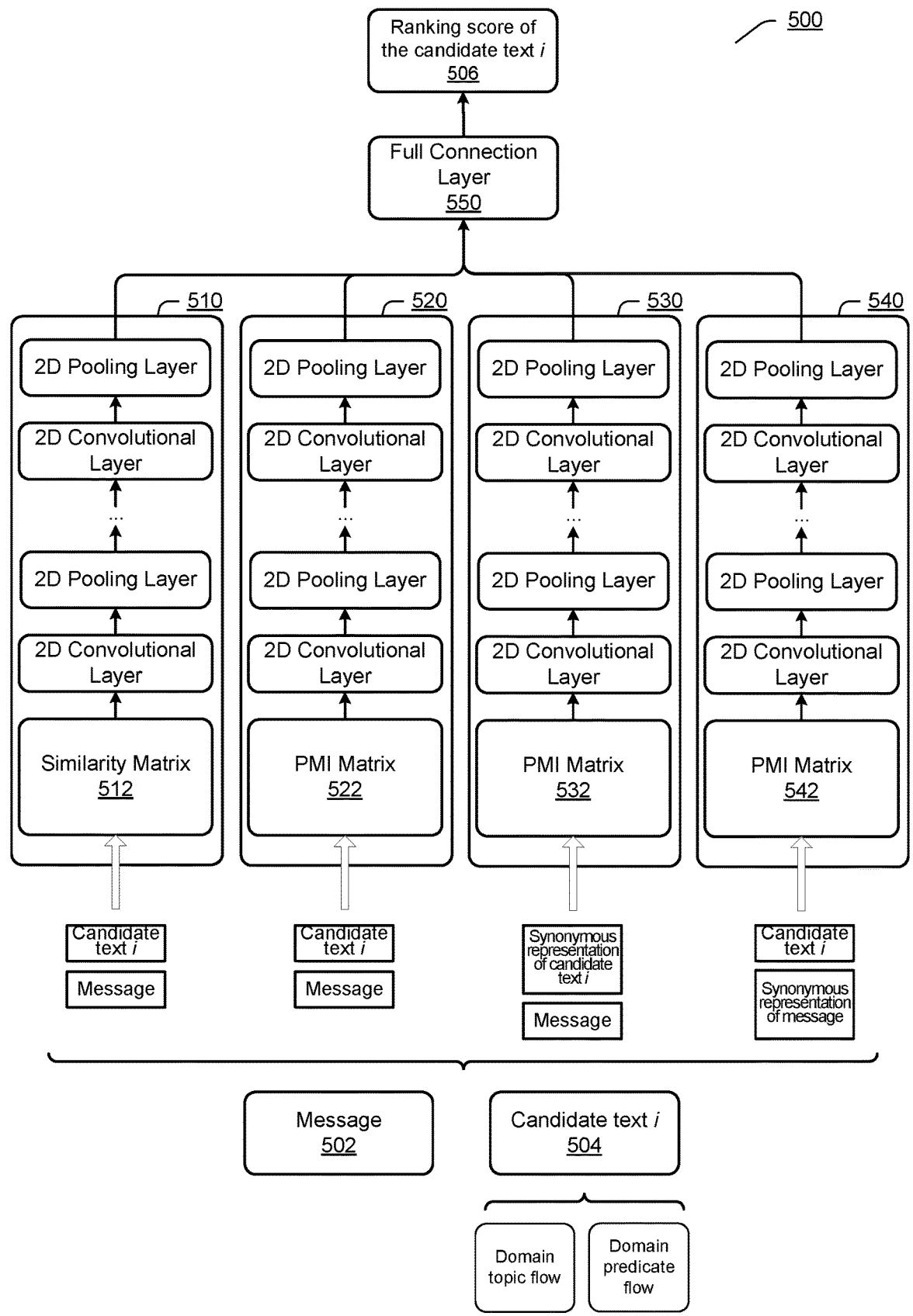
FIG. 5 illustrates an exemplary process for performing convolutional neural network (CNN)-based ranking to candidate texts according to an embodiment.

FIG. 5 illustrates an exemplary process 500 for performing convolutional neural network (CNN)-based ranking to candidate texts according to an embodiment. The process 500 may be performed, e.g., for selecting the complementary text for the message from the plurality of candidate texts in the domain topic flow and/or domain predicate flow at 216 in FIG. 2. For example, through the process 500, ranking scores may be generated for the plurality of candidate texts respectively, and then the top-ranked candidate text may be selected as the complementary text.

A ranking model on which the process 500 is based may be regarded as an extension and improvement of the existing CNN-based text matching method. An example of the CNN-based text matching method may be the MatchPyramid model, which is a CNN-based model for predicting text similarity. The ranking model on which the process 500 is based may consider not only text similarity between a candidate text and a message, but also PMI between the candidate text and the message, PMI between a synonymous representation of the candidate text and the message, PMI between the candidate text and a synonymous representation of the message, etc. A PMI indicates possibility that a candidate text and a message co-occur, and thus may indicate the relevance between the candidate text and the message. Since effective information, e.g., PMI, is introduced, the ranking model may be more efficient, more controllable, and more accurate.

For a message 502, a candidate text i 504 may be taken from a domain topic flow and/or a domain predicate flow. Then, a ranking score of the candidate text i 504 may be calculated.

In branch 510, a text similarity matrix 512 between the candidate text i and the message may be calculated first. The text similarity matrix 512 may be calculated based on cosine distance, dot product, etc. between a vector representation of the candidate text i and a vector representation of the message. Assuming that the candidate text i comprises n words and the message comprises m words, a similarity value between each of the n words in the candidate text i and each of the m words in the message may be calculated respectively, thus, the text similarity matrix 512 in a dimension of n×m is formed. The branch 510 may comprise one or more 2-dimensional (2D) convolutional layers and optionally a 2D pooling layer connected to each convolutional layer. The 2D convolutional layers may be used for feature extraction of the similarity matrix 512. A CNN result output by the branch 510 may be provided to a full connection layer 550.

In branch 520, a PMI matrix 522 between the candidate text i and the message may be calculated first. The PMI matrix 522 may be calculated through any existing PMI calculating approach. Assuming that the candidate text i comprises n words and the message comprises m words, a PMI value between each of the n words in the candidate text i and each of the m words in the message may be calculated respectively, thus, the PMI matrix 522 in a dimension of n×m is formed. Similar with the branch 510, the branch 520 may also comprise a series of 2D convolutional layers and optionally a 2D pooling layer connected to each convolutional layer. A CNN result output by the branch 520 may be provided to the full connection layer 550.

In branch 530, a PMI matrix 532 between a synonymous representation of the candidate text i and the message may be calculated first. The synonymous representation of the candidate text i may refer to a text generated through replacing at least one word or all words in the candidate text i with corresponding semantically similar words. Here, semantically similar words may refer to words with similar language meanings, or words with higher semantic similarity in the field of natural language processing. For example, taking a candidate text i "Nanjing" and a message "Are there any interesting places" as an example, since a synonymous representation of the candidate text i "Nanjing" may be "Beijing", a PMI between "Beijing" and "Are there any interesting places" may be calculated. Through calculating the PMI matrix between the synonymous representation of the candidate text i and the message, the accuracy of assessment of the relevance between the candidate text i and the message may be enhanced. For example, in the case that the candidate text i and the message have a low co-occurrence frequency but actually have a high relevance, the synonymous representation of the candidate text i may have a high PMI metric with the message, and this PMI metric may be used for compensating for the low PMI metric between the candidate text i and the message, thereby more realistically reflecting the relevance between the candidate text i and the message. Continue with the previous example, there may be a high relevance between the candidate text i "Nanjing" and the message "Are there any interesting places", e.g., there may be a high possibility of being combined into "Are there any interesting places in Nanjing", but a PMI metric between "Nanjing" and "Are there any interesting places" may be low, e.g., 0.5, thus cannot accurately reflect the high relevance between them. In this case, since "Beijing", which is the synonymous representation of "Nanjing", has a high PMI metric with the message "Are there any interesting places", e.g., 0.9, the consideration of this PMI metric may more realistically reflect the relevance between the candidate text i "Nanjing" and the message "Are there any interesting places".

Assuming that the candidate text i comprises n words and the message comprises m words, the PMI matrix 532 in a dimension of n×m may be formed. A PMI value at each element [x, y] in the PMI matrix 532 may be calculated through various approaches, wherein $x \in [1, n]$ and $y \in [1, m]$. For example, in an approach, the PMI value at the element [x, y] may be a PMI value between the most semantically similar word of the x-th word in the candidate text i and the y-th word in the message. In an approach, the PMI value at the element [x, y] may be an average value of multiple PMI values between multiple semantically similar words of the x-th word in the candidate text i and the y-th word in the message. In an approach, the PMI value at the element [x, y] may be the maximum value among multiple PMI values between multiple semantically similar words of the x-th word in the candidate text i and the y-th word in the message. Similar with the branch 510, the branch 530 may also comprise a series of 2D convolutional layers and optionally a 2D pooling layer connected to each convolutional layer. A CNN result output by the branch 530 may be provided to the full connection layer 550.

In branch 540, a PMI matrix 542 between the candidate text i and a synonymous representation of the message may be calculated first. The synonymous representation of the message may refer to a text generated through replacing at least one word or all words in the message with corresponding semantically similar words. Through calculating the PMI matrix between the candidate text i and the synonymous representation of the message, the accuracy of assessment of the relevance between the candidate text i and the message may be enhanced. For example, in the case that the candidate text i and the message have a low co-occurrence frequency but actually have a high relevance, the candidate text i may have a high PMI metric with the synonymous representation of the message, and this PMI metric may be used for compensating for the low PMI metric between the candidate text i and the message, thereby more realistically reflecting the relevance between the candidate text i and the message.

Assuming that the candidate text i comprises n words and the message comprises m words, the PMI matrix 542 in a dimension of n×m may be formed. A PMI value at each element [x, y] in the PMI matrix 542 may be calculated through various approaches, wherein $x \in [1, n]$ and $y \in [1, m]$. For example, in an approach, the PMI value at the element [x, y] may be a PMI value between the x-th word in the candidate text i and the most semantically similar word of the y-th word in the message. In an approach, the PMI value at the element [x, y] may be an average value of multiple PMI values between the x-th word in the candidate text i and multiple semantically similar words of the y-th word in the message. In an approach, the PMI value at the element [x, y] may be the maximum value among multiple PMI values between the x-th word in the candidate text i and multiple semantically similar words of the y-th word in the message. Similar with the branch 510, the branch 540 may also comprise a series of 2D convolutional layers and optionally a 2D pooling layer connected to each convolutional layer. A CNN result output by the branch 540 may be provided to the full connection layer 550.

The full connection layer 550 may perform conversion to the CNN results from the branches 510, 520, 530 and 540, and may adopt, e.g., a softmax function to generate a ranking score 506 of the candidate text i.

It should be appreciated that although FIG. 5 shows that the ranking model comprises the branches 510, 520, 530 and 540, the ranking model may also comprise only some of these branches, and accordingly the ranking score may be generated based on one or more of the text similarity between the candidate text and the message, the PMI between the candidate text and the message, the PMI between the synonymous representation of the candidate text and the message, and the PMI between the candidate text and the synonymous representation of the message.

After ranking scores are obtained for all the candidate texts, a candidate text with the highest ranking score may be selected as the complementary text according to the ranking scores of these candidate texts.

Figure 6:
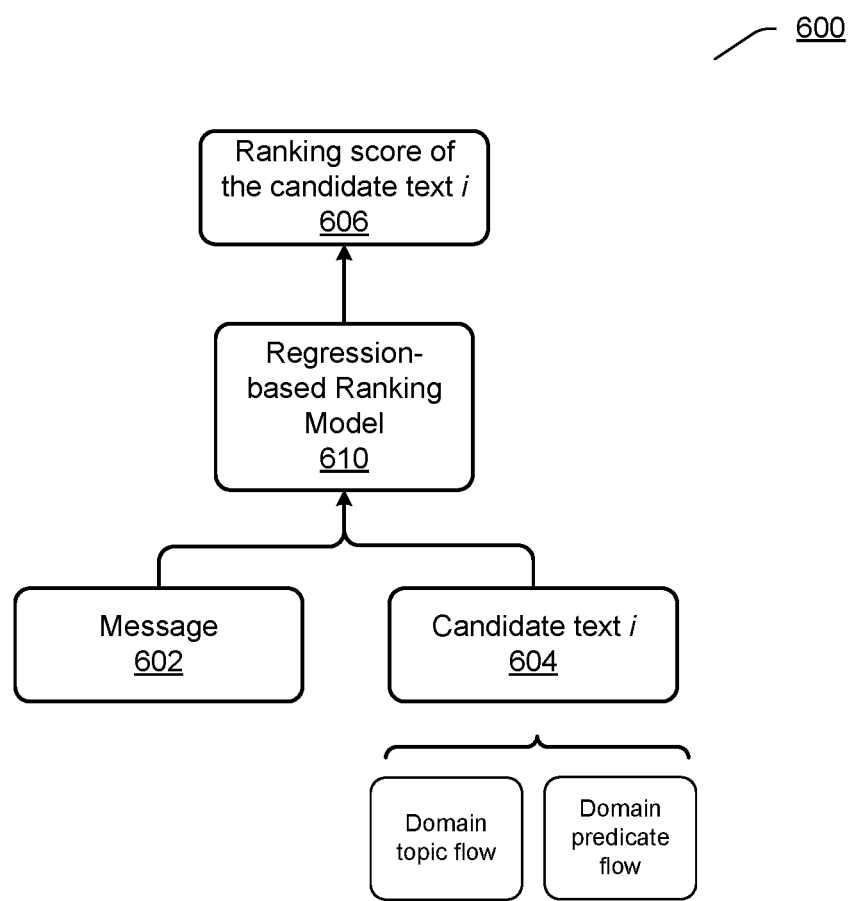
FIG. 6 illustrates an exemplary process for performing regression-based ranking to candidate texts according to an embodiment.

FIG. 6 illustrates an exemplary process 600 for performing regression-based ranking to candidate texts according to an embodiment. The process 600 may be performed, e.g., for selecting the complementary text for the message from the plurality of candidate texts in the domain topic flow and/or domain predicate flow at 216 in FIG. 2. For example, through the process 600, ranking scores may be generated for the plurality of candidate texts respectively, and then the top-ranked candidate text may be selected as the complementary text.

The process 600 may adopt a regression-based ranking model 610. The ranking model 610 may be based on various regression algorithms, e.g., a gradient boosting decision tree (GBDT). The ranking model 610 may adopt at least one item of session level information in the domain topic flow and domain predicate flow as features, e.g., a frequency that a candidate text has occurred in the session, whether the candidate text occurred in the last message, whether the candidate text occurred in the last response, the number of turns having passed since the candidate text occurred last time in the session, whether the candidate text comes from a message, whether the candidate text comes from a response, etc. Moreover, the ranking model 610 may also adopt PMI between the candidate text and the message, text similarity between the candidate text and the message, etc. as features. The training model 610 may be trained with training data having labels corresponding to at least one of the above features.

For a message 602, a candidate text i 604 may be taken from the domain topic flow and/or domain predicate flow. Then, the ranking model 610 may calculate a ranking score 606 of the candidate text i 604 with features extracted from the message 602, the candidate text i 604, the domain topic flow, the domain predicate flow, etc. After ranking scores are obtained for all the candidate texts, a candidate text with the highest ranking score may be selected as the complementary text according to the ranking scores of these candidate texts.

Although the selection of complementary text through CNN-based ranking is discussed above in connection with FIG. 5 and the selection of complementary text through regression-based ranking is discussed above in connection with FIG. 6, the embodiments of the present disclosure may also combine these two ranking approaches together for selecting a complementary text. For example, for the candidate text i, after the ranking score 506 is obtained through the process 500 and the ranking score 606 is obtained through the process 600, the ranking score 506 and the ranking score 606 may be combined, e.g., weighted and summed, to determine a final ranking score of the candidate text i. After final ranking scores are determined for all candidate texts, a candidate text with the highest final ranking score may be selected as the complementary text.

Moreover, it should be appreciated that the training of the ranking model on which the process 500 is based in FIG. 5 and the ranking model 610 in FIG. 6 basically does not require domain-specific labeled data, and when implementing or applying these ranking models, PMI data in different domains may be used directly for performing ranking in different domains. Therefore, these ranking models may be easily transferred among different domains.

Figure 7:
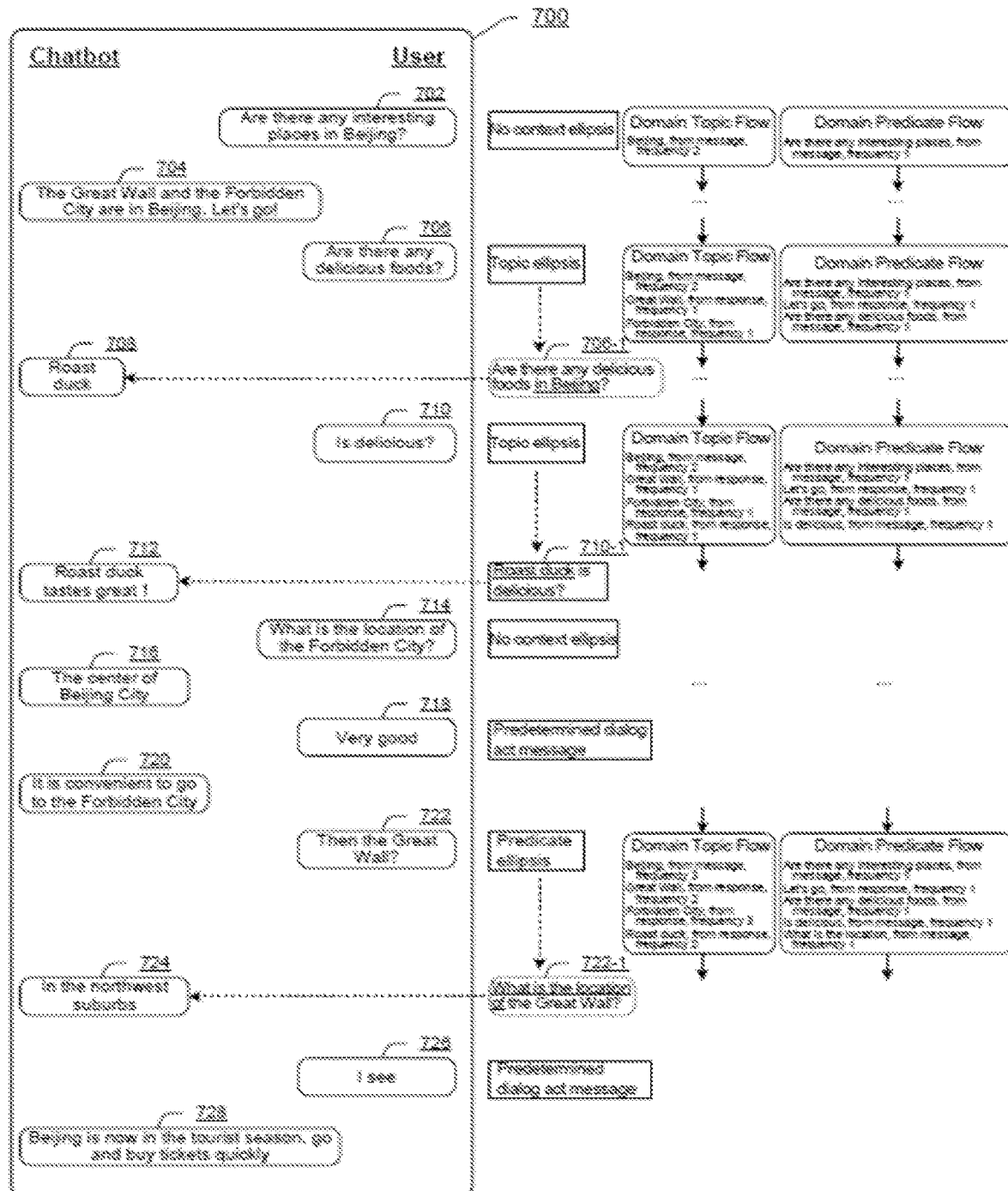
FIG. 7 illustrates an exemplary session to which context completion according to an embodiment is applied.

FIG. 7 illustrates an exemplary session 700 to which context completion according to an embodiment is applied. The session 700 involves a specific domain, e.g., the tourism domain. In the session 700, the chatbot applies the method for performing context completion to messages in a session according to an embodiment of the present disclosure.

At the beginning of the session 700, a message 702 "Are there any interesting places in Beijing?" is received from a user. A topic "Beijing" extracted from the message 702 may be added to a domain topic flow of the current domain, e.g., creating an entry for the topic "Beijing", and a predicate "Are there any interesting places" extracted from the message 702 may be added to a domain predicate flow of the current domain, e.g., creating an entry for the predicate "Are there any interesting places". Moreover, session level information may also be determined and added to a corresponding entry in the domain topic flow and the domain predicate flow. For example, for the topic "Beijing", session level information "from message" is determined, which indicates that the topic occurs in a message for the first time, and "frequency 1" is determined, which indicates that the topic has occurred in the session once. For example, for the predicate "Are there any interesting places", session level information "from message" is determined, which indicates that the predicate occurs in a message for the first time, and "frequency 1" is determined, which indicates that the predicate has occurred in the session once.

For the message 702, it may be determined that there exists no context ellipsis. Therefore, a response 704 "The Great Wall and the Forbidden City are in Beijing. Let's go!" may be provided through an existing response retrieval or generation approach. The response 704 will trigger an update to the domain topic flow and the domain predicate flow (not shown).

When a message 706 "Are there any delicious foods?" is received, the domain topic flow and the domain predicate flow may be updated accordingly. It may be determined that there exists topic ellipsis in the message 706. A complementary text "Beijing" may be selected from the domain topic flow, and a completed message 706-1 "Are there any delicious foods in Beijing?" may be generated. For the completed message 706-1, a response 708 "Roast duck" may be provided, and the domain topic flow and the domain predicate flow are updated accordingly (not shown).

When a message 710 "Is delicious?" is received, the domain topic flow and the domain predicate flow may be updated accordingly. It may be determined that there exists topic ellipsis in the message 710. A complementary text "Roast duck" may be selected from the domain topic flow, and a completed message 710-1 "Roast duck is delicious?" may be generated. For the completed message 710-1, a response 712 "Roast duck tastes great!" may be provided, and the domain topic flow and the domain predicate flow are updated accordingly (not shown).

When a message 714 "What is the location of the Forbidden City?" is received, the domain topic flow and the domain predicate flow may be updated accordingly (not shown). It may be determined that there exists no context ellipsis in the message 714. For the message 714, a response 716 "The center of Beijing City" may be provided, and the domain topic flow and the domain predicate flow are updated accordingly (not shown).

When a message 718 "Very good" is received, it may be determined that there exist topic ellipsis and predicate ellipsis in the message 718, and it may be further determined that the message 718 is a predetermined dialog act message. A response 720 "It is convenient to go to the Forbidden City" may be provided based on a response strategy corresponding to the dialog act of the message 718, and the domain topic flow and the domain predicate flow are updated accordingly (not shown).

When a message 722 "Then the Great Wall?" is received, the domain topic flow and the domain predicate flow may be updated accordingly. It may be determined that there exists predicate ellipsis in the message 722. A complementary text "What is the location of" may be selected from the domain predicate flow, and a completed message 722-1 "What is the location of the Great Wall?" may be generated. For the completed message 722-1, a response 724 "In the northwest suburbs" may be provided, and the domain topic flow and the domain predicate flow are updated accordingly (not shown).

When a message 726 "I see" is received, it may be determined that there exist topic ellipsis and predicate ellipsis in the message 726, and it may be further determined that the message 726 is a predetermined dialog act message. A response 728 "Beijing is now in the tourist season, go and buy tickets quickly" may be provided based on a response strategy corresponding to the dialog act of the message 726, and the domain topic flow and the domain predicate flow are updated accordingly (not shown).

It should be appreciated that the session 700 in FIG. 7 and the accompanying processing procedures are all exemplary, and may be changed in any approaches according to specific application scenarios. Although only session level information about where a topic/predicate comes from and session level information about the number of times a topic/predicate has occurred in the session are shown in FIG. 7, any other session level information may also be determined and added to the domain topic flow and the domain predicate flow.

Figure 8:
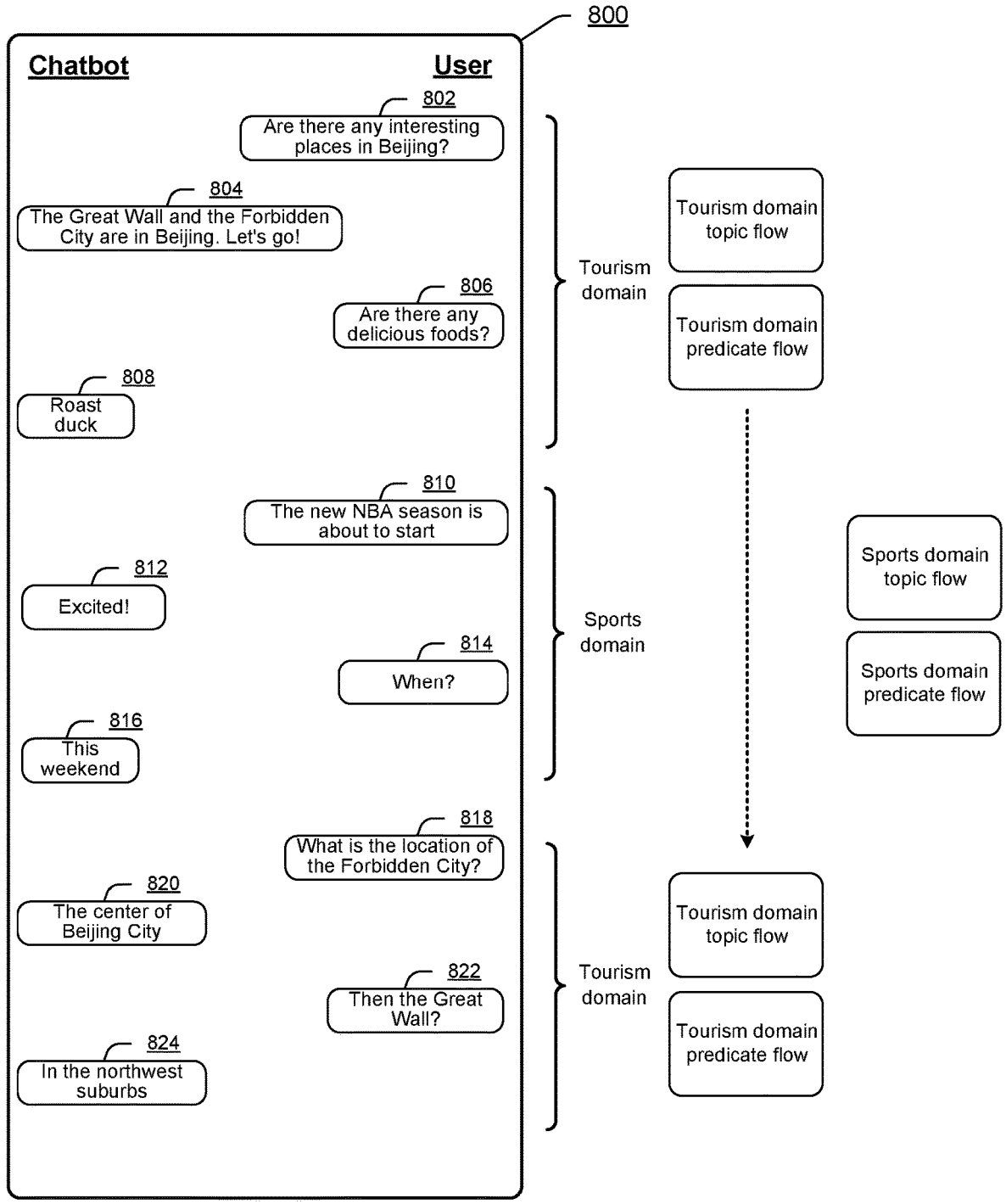
FIG. 8 illustrates an exemplary session to which context completion according to an embodiment is applied.

FIG. 8 illustrates an exemplary session 800 to which context completion according to an embodiment is applied. The session 800 involves transferring between different domains, e.g., the tourism domain and the sports domain. In the session 800, the chatbot applies the method for performing context completion to messages in a session according to an embodiment of the present disclosure.

When a message 802 "Are there any interesting places in Beijing?" is received, it may be determined that the message relates to the tourism domain, and a tourism domain topic flow and/or a tourism domain predicate flow maintained for the tourism domain may be updated. The chatbot may provide a response 804 "The Great Wall and the Forbidden City are in Beijing. Let's go!", and update the tourism domain topic flow and/or the tourism domain predicate flow accordingly.

When a message 806 "Are there any delicious foods?" is received, it may be determined that the message is retained in the current domain, e.g., retained in the tourism domain, and the tourism domain topic flow and/or the tourism domain predicate flow may be updated. The chatbot may generate a completed message "Are there any delicious foods in Beijing?" for the message 806 with the tourism domain topic flow and/or the tourism domain predicate flow, and provide a response 808 "Roast duck", and update the tourism domain topic flow and/or the tourism domain predicate flow accordingly.

When a message 810 "The new NBA season is about to start" is received, it may be determined that the message is transferred to the sports domain, and a sports domain topic flow and/or a sports domain predicate flow maintained for the sports domain may be updated. The chatbot may provide a response 812 "Excited!", and update the sports domain topic flow and/or the sports domain predicate flow accordingly.

When a message 814 "When?" is received, it may be determined that the message is retained in the current domain, e.g., retained in the sports domain, and the sports domain topic flow and/or the sports domain predicate flow may be updated. The chatbot may generate a completed message "When does the new NBA season start?" for the message 814 with the sports domain topic flow and/or the sports domain predicate flow, and provide a response 816 "This weekend", and update the sports domain topic flow and/or the sports domain predicate flow accordingly.

When a message 818 "What is the location of the Forbidden City?" is received, it may be determined that the message is transferred back to the tourism domain, and the tourism domain topic flow and/or the tourism domain predicate flow maintained for the tourism domain may be updated. The chatbot may provide a response 820 "The center of Beijing City", and update the tourism domain topic flow and/or the tourism domain predicate flow accordingly.

When a message 822 "Then the Great Wall?" is received, it may be determined that the message is retained in the current domain, e.g., retained in the tourism domain, and the tourism domain topic flow and/or the tourism domain predicate flow may be updated. The chatbot may generate a completed message "What is the location of the Great Wall?" for the message 822 with the tourism domain topic flow and/or the tourism domain predicate flow, and provide a response 824 "In the northwest suburbs", and update the tourism domain topic flow and/or the tourism domain predicate flow accordingly.

Figure 9:
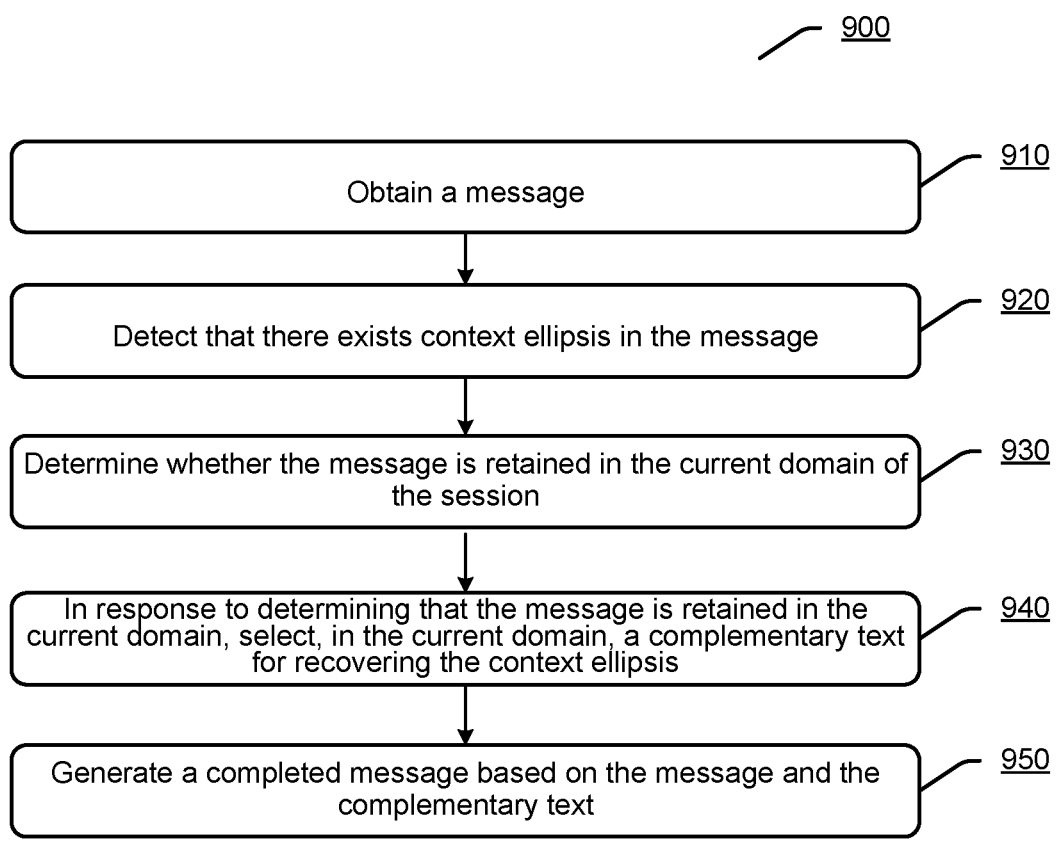
FIG. 9 illustrates a flowchart of an exemplary method for performing context completion to messages in a session according to an embodiment.

FIG. 9 illustrates a flowchart of an exemplary method 900 for performing context completion to messages in a session according to an embodiment.

At 910, a message may be obtained.

At 920, it may be detected that there exists context ellipsis in the message.

At 930, it may be determined whether the message is retained in the current domain of the session.

At 940, in response to determining that the message is retained in the current domain, a complementary text for recovering the context ellipsis may be selected in the current domain.

At 950, a completed message may be generated based on the message and the complementary text.

In an implementation, the detecting that there exists context ellipsis in the message comprises: extracting a topic and/or predicate from the message; and determining that there exists topic ellipsis or predicate ellipsis in the message based on a result of the extracting.

In an implementation, the method 900 may further comprise: adding the extracted topic and/or predicate into a domain topic flow and/or domain predicate flow of the current domain respectively.

In an implementation, the method 900 may further comprise: determining session level information associated with the extracted topic and/or predicate; and adding the session level information into a domain topic flow and/or domain predicate flow of the current domain respectively.

In an implementation, the extracting may be performed based at least on a pre-established knowledge graph.

In an implementation, the determining whether the message is retained in the current domain of the session may comprise: in response to determining that there exists the topic ellipsis in the message, determining whether the message is retained in the current domain through a domain retaining classifier. The domain retaining classifier may be based on a RNN model. The domain retaining classifier may be obtained, through knowledge distillation, from a classifier which is based on a BERT model.

In an implementation, the determining whether the message is retained in the current domain of the session may comprise: in response to determining that there exists the predicate ellipsis in the message, determining whether the message is retained in the current domain based on a topic included in the message.

In an implementation, the selecting a complementary text may comprise: in response to determining that there exists the topic ellipsis in the message, selecting the complementary text from the domain topic flow; or in response to determining that there exists the predicate ellipsis in the message, selecting the complementary text from the domain predicate flow.

In an implementation, the selecting a complementary text may comprise: selecting the complementary text from a plurality of candidate texts in the domain topic flow and/or domain predicate flow, through at least one of CNN-based ranking and regression-based ranking. The CNN-based ranking may be performed according to at least one of the following information of a candidate text: text similarity between the candidate text and the message, PMI between the candidate text and the message, PMI between the candidate text and a synonymous representation of the message, and PMI between a synonymous representation of the candidate text and the message. The regression-based ranking may be performed according to at least one of the following features of a candidate text: a frequency that the candidate text has occurred in the session, whether the candidate text occurred in the last message, whether the candidate text occurred in the last response, the number of turns having passed since the candidate text occurred last time in the session, PMI between the candidate text and the message, and text similarity between the candidate text and the message.

In an implementation, the generating a completed message may comprise: generating at least one candidate completed message through placing the complementary text at different positions of the message; and selecting the completed message from the at least one candidate completed message through a language model.

In an implementation, the method 900 may further comprise: in response to determining that the message is not retained in the current domain, determining a domain corresponding to the message; selecting, in the domain corresponding to the message, a complementary text for recovering the context ellipsis; and generating a completed message based on the message and the complementary text.

It should be appreciated that the method 900 may further comprise any step/process for performing context completion to messages in a session according to the above embodiments of the present disclosure.

Figure 10:
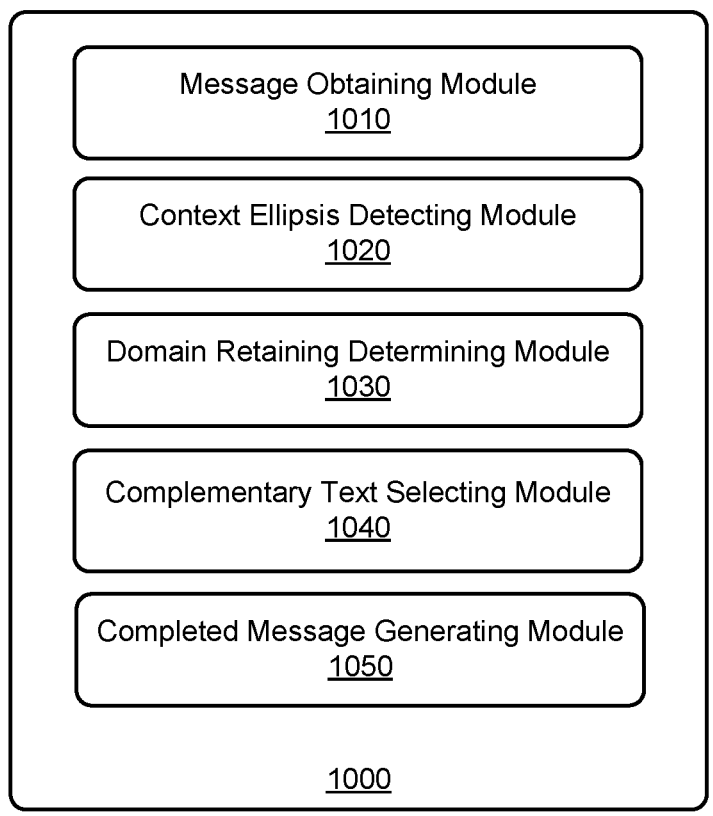
FIG. 10 illustrates an exemplary apparatus for performing context completion to messages in a session according to an embodiment.

FIG. 10 illustrates an exemplary apparatus 1000 for performing context completion to messages in a session according to an embodiment.

The apparatus 1000 may comprise: a message obtaining module 1010, for obtaining a message; a context ellipsis detecting module 1020, for detecting that there exists context ellipsis in the message; a domain retaining determining module 1030, for determining whether the message is retained in the current domain of the session; a complementary text selecting module 1040, for in response to determining that the message is retained in the current domain, selecting, in the current domain, a complementary text for recovering the context ellipsis; and a completed message generating module 1050, for generating a completed message based on the message and the complementary text.

In an implementation, the context ellipsis detecting module 1020 may be for: extracting a topic and/or predicate from the message; and determining that there exists topic ellipsis or predicate ellipsis in the message based on a result of the extracting.

In an implementation, the apparatus 1000 may further comprise: a flow updating module, for adding the extracted topic and/or predicate into a domain topic flow and/or domain predicate flow of the current domain respectively.

In an implementation, the domain retaining determining module 1030 may be for: in response to determining that there exists the topic ellipsis in the message, determining whether the message is retained in the current domain through a domain retaining classifier; or in response to determining that there exists the predicate ellipsis in the message, determining whether the message is retained in the current domain based on a topic included in the message.

In an implementation, the complementary text selecting module 1040 may be for: in response to determining that there exists the topic ellipsis in the message, selecting the complementary text from the domain topic flow; or in response to determining that there exists the predicate ellipsis in the message, selecting the complementary text from the domain predicate flow.

In an implementation, the complementary text selecting module 1040 may be for: selecting the complementary text from a plurality of candidate texts in the domain topic flow and/or domain predicate flow, through at least one of CNN-based ranking and regression-based ranking.

Moreover, the apparatus 1000 may further comprise any other modules configured for performing context completion to messages in a session according to the above embodiments of the present disclosure.

Figure 11:
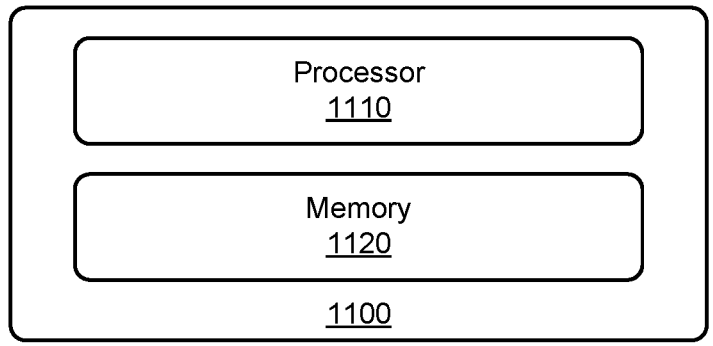
FIG. 11 illustrates an exemplary apparatus for performing context completion to messages in a session according to an embodiment.

FIG. 11 illustrates an exemplary apparatus 1100 for performing context completion to messages in a session according to an embodiment.

The apparatus 1100 may comprise at least one processor 1110 and a memory 1120 storing computer-executable instructions. When executing the computer-executable instructions, the processor 1110 may: obtain a message; detect that there exists context ellipsis in the message; determine whether the message is retained in the current domain of the session; in response to determining that the message is retained in the current domain, select, in the current domain, a complementary text for recovering the context ellipsis; and generate a completed message based on the message and the complementary text. Moreover, the processor 1110 may further perform any other processing for performing context completion to messages in a session according to the above embodiments of the present disclosure.

The embodiments of the present disclosure may be embodied in a non-transitory computer-readable medium. The non-transitory computer-readable medium may comprise instructions that, when executed, cause one or more processors to perform any operations of the methods for performing context completion to messages in a session according to the above embodiments of the present disclosure.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or be combined together.

Processors are described in connection with various apparatus and methods. These processors may be implemented using electronic hardware, computer software, or any combination thereof. Whether these processors are implemented as hardware or software will depend on the specific application and the overall design constraints imposed on the system. By way of example, a processor, any portion of a processor, or any combination of processors presented in this disclosure may be implemented as a microprocessor, a micro-controller, a digital signal processor (DSP), a field programmable gate array (FPGA), a programmable logic device (PLD), state machine, gate logic, discrete hardware circuitry, and other suitable processing components configured to perform the various functions described in this disclosure. The functions of a processor, any portion of a processor, or any combination of processors presented in this disclosure may be implemented as software executed by a microprocessor, a micro-controller, a DSP, or other suitable platforms.

Software should be considered broadly to represent instructions, instruction sets, code, code segments, program code, programs, subroutines, software modules, applications, software applications, software packages, routines, subroutines, objects, running threads, processes, functions, etc. Software may reside on computer readable medium. Computer readable medium may include, e.g., a memory, which may be, e.g., a magnetic storage device (e.g., a hard disk, a floppy disk, a magnetic strip), an optical disk, a smart card, a flash memory device, a random access memory (RAM), a read only memory (ROM), a programmable ROM (PROM), an erasable PROM (EPROM), an electrically erasable PROM (EEPROM), a register, or a removable disk. Although a memory is shown as being separate from the processor in various aspects presented in this disclosure, a memory may also be internal to the processor (e.g., a cache or a register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalent transformations to the elements of the various aspects of the present disclosure, which are known or to be apparent to those skilled in the art, are intended to be covered by the claims.

The invention claimed is:

1. A method for performing context completion to messages in a session, comprising:
    obtaining a first message;
    detecting a context ellipsis in the first message;
    determining whether the first message is retained in a current domain of the session;
    in response to determining that the first message is retained in the current domain, selecting, in the current domain, a complementary text for recovering the first message context ellipsis using neural network-based ranking, wherein the selecting includes:
        calculating a matrix between the complementary text and the first message where the complementary text includes n values and the first message includes m values in the matrix;
        extracting a feature from the matrix using a convolutional layer that is coupled with a pooling layer;
        outputting a result based on the matrix and the feature to a connection layer; and
        generating a ranking using the result where the selecting is based on the ranking;
    generating a completed message based on the first message and the complementary text;
    obtaining a second message;
    detecting a context ellipsis in the second message;
    determining the second message context ellipsis is a predetermined dialogue act message; and
    providing a response to the second message, the response being provided based on a response strategy corresponding to the predetermined dialogue act message.

2. The method of claim 1, wherein the detecting that there exists context ellipsis in the first message comprises:
    extracting a topic and/or predicate from the first message; and
    determining that there exists topic ellipsis or predicate ellipsis in the first message based on a result of the extracting the topic.

3. The method of claim 2, further comprising:
    adding the extracted topic and/or predicate into a domain topic flow and/or domain predicate flow of the current domain respectively.

4. The method of claim 2, further comprising:
    determining session level information associated with the extracted topic and/or predicate; and
    adding the session level information into a domain topic flow and/or domain predicate flow of the current domain respectively.

5. The method of claim 2, wherein, the extracting the topic is performed based at least on a pre-established knowledge graph.

6. The method of claim 2, wherein the determining whether the first message is retained in the current domain of the session comprises:
    in response to determining that there exists the topic ellipsis in the first message, determining whether the first message is retained in the current domain through a domain retaining classifier.

7. The method of claim 6, wherein,
    the domain retaining classifier is based on a recurrent neural network (RNN) model, and
    the domain retaining classifier is obtained, through knowledge distillation, from a classifier which is based on a bidirectional encoder representations from transformers (BERT) model.

8. The method of claim 2, wherein the determining whether the first message is retained in the current domain of the session comprises:
    in response to determining that there exists the predicate ellipsis in the first message, determining whether the first message is retained in the current domain based on a topic included in the first message.

9. The method of claim 3, wherein the selecting a complementary text comprises:
    in response to determining that there exists the topic ellipsis in the first message, selecting the complementary text from the domain topic flow; or
    in response to determining that there exists the predicate ellipsis in the first message, selecting the complementary text from the domain predicate flow.

10. The method of claim 3, wherein the selecting a complementary text comprises:
    selecting the complementary text from a plurality of candidate texts in the domain topic flow and/or domain predicate flow, through at least one of convolutional neural network (CNN)-based ranking and regression-based ranking.

11. The method of claim 10, wherein,
    the CNN-based ranking is performed according to at least one of a following information of a candidate text:
    text similarity between the candidate text and the first message,
    pointwise mutual information (PMI) between the candidate text and the first message,
    PMI between the candidate text and a synonymous representation of the first message, and
    PMI between a synonymous representation of the candidate text and the first message; and
    the regression-based ranking is performed according to at least one of a following features of a candidate text:
    a frequency that the candidate text has occurred in the session, whether the candidate text occurred in a last message,
whether the candidate text occurred in a last response,
a number of turns having passed since the candidate text occurred last time in the session,
PMI between the candidate text and the first message, and
text similarity between the candidate text and the first message.

12. The method of claim 1, wherein the generating a completed message comprises:
generating at least one candidate completed message through placing the complementary text at different positions of the first message; and
selecting the completed message from the at least one candidate completed message through a language model.

13. The method of claim 1, further comprising:
in response to determining that the first message is not retained in the current domain, determining a domain corresponding to the first message;
selecting, in the domain corresponding to the first message, a complementary text for recovering the context ellipsis; and
generating a completed message based on the first message and the complementary text.

14. An apparatus for performing context completion to messages in a session, comprising:
a message obtaining module, for obtaining a first message;
a context ellipsis detecting module, for detecting a context ellipsis in the first message;
a domain retaining determining module, for determining whether the first message is retained in a current domain of the session;
a complementary text selecting module, for in response to determining that the first message is retained in the current domain, selecting, in the current domain, a complementary text for recovering the context ellipsis using neural network-based ranking, wherein the selecting includes:
calculating a matrix between the complementary text and the first message where the complementary text includes n values and the first message includes m values in the matrix;
extracting a feature from the matrix using a convolutional layer that is coupled with a pooling layer;
outputting a result based on the matrix and the feature to a connection layer; and
generating a ranking using the result where the selecting is based on the ranking;
a completed message generating module, for generating a completed message based on the first message and the complementary text;
a module for obtaining a second message;
a module for detecting a context ellipsis in the second message;
a module for determining the second message context ellipsis is a predetermined dialogue act message; and
a module for providing a response to the second message, the response being provided based on a response strategy corresponding to the predetermined dialogue act message.

15. An apparatus for performing context completion to messages in a session, comprising:
at least one processor; and
a memory storing computer-executable instructions that, when executed, cause the at least one processor to:
obtain a first message,
detect a context ellipsis in the first message,
determine whether the first message is retained in a current domain of the session,
in response to determining that the first message is retained in the current domain, select, in the current domain, a complementary text for recovering the first context ellipsis using neural network-based ranking, wherein the selecting includes: calculating a matrix between the complementary text and the first message where the complementary text includes n values and the first message includes m values in the matrix; extracting a feature from the matrix using a convolutional layer that is coupled with a pooling layer; outputting a result based on the matrix and the feature to a connection layer; and generating a ranking using the result where the selecting is based on the ranking,
generate a completed message based on the first message and the complementary text,
obtain a second message,
detect a context ellipsis in the second message,
determine the second message context ellipsis is a predetermined dialogue act message,
and
provide a response to the second message, the response being provided based on a response strategy corresponding to the predetermined dialogue act message.

* * * * *